United States Patent [19]

Sakamoto et al.

[11] Patent Number: 4,914,370
[45] Date of Patent: Apr. 3, 1990

[54] SERVO-CONTROL CIRCUIT

[75] Inventors: Keiji Sakamoto, Tokyo; Shunsuke Matsubara, Yamanashi, both of Japan

[73] Assignee: Fanuc Ltd., Minamitsuru, Japan

[21] Appl. No.: 274,147

[22] PCT Filed: Apr. 26, 1988

[86] PCT No.: PCT/JP88/00408

§ 371 Date: Nov. 9, 1988

§ 102(e) Date: Nov. 9, 1988

[87] PCT Pub. No.: WO88/08563

PCT Pub. Date: Nov. 3, 1988

[30] Foreign Application Priority Data

Apr. 30, 1987 [JP] Japan ................... 62-107256

[51] Int. Cl.$^4$ ............................. G11B 21/08
[52] U.S. Cl. ...................... 318/616; 318/561; 318/618; 318/621
[58] Field of Search ............... 318/564–574, 318/592, 594, 600–632; 388/800–860

[56] References Cited

U.S. PATENT DOCUMENTS

| | | | |
|---|---|---|---|
| 3,377,548 | 4/1968 | Newbold | 318/610 X |
| 3,599,063 | 8/1971 | Nanai | 318/610 X |
| 3,694,720 | 9/1972 | Nakajima | 388/822 |
| 3,732,478 | 5/1973 | MacMullan | 318/616 |
| 3,748,565 | 7/1973 | Wilson et al. | 318/621 X |
| 3,909,734 | 9/1975 | Palombo et al. | 388/830 X |
| 3,927,360 | 12/1975 | MacMullan | 318/619 |
| 3,944,896 | 3/1976 | Rodek | 318/619 X |
| 3,947,738 | 3/1976 | Oliver | 318/599 X |
| 3,983,464 | 9/1976 | Peterson | 388/823 |
| 4,019,107 | 4/1977 | Dixon et al. | 388/806 |
| 4,044,289 | 8/1977 | Wenzel et al. | 318/571 |
| 4,096,426 | 6/1978 | Tremaine et al. | 318/611 |
| 4,146,828 | 3/1979 | Rose et al. | 318/599 |
| 4,303,873 | 12/1981 | Hawkins | 388/822 |
| 4,321,517 | 3/1982 | Touchton et al. | 318/618 |
| 4,374,350 | 2/1983 | Kohzai et al. | 318/616 X |
| 4,540,926 | 9/1985 | Kolzer et al. | 318/610 X |
| 4,612,489 | 9/1986 | Gunda | 318/611 X |
| 4,733,149 | 3/1988 | Culberson | 318/332 X |
| 4,780,653 | 10/1988 | Bezos et al. | 388/822 |
| 4,816,734 | 3/1989 | Kurakake et al. | 318/618 X |

Primary Examiner—William M. Shoop, Jr.
Assistant Examiner—Paul Ip
Attorney, Agent, or Firm—Staas & Halsey

[57] ABSTRACT

A servo-control circuit that suppresses an incomplete integration term, which is contained in an integration gain of a velocity feedback loop in a velocity control block (5), when an error between a position signal from a mechanical system and a move command exceeds a predetermined reference value. As a result, a torque command applied to a current control block (6) is controlled so as to minimize a torque which causes overshoot along a static friction characteristic of the mechanical system. Thus, an effect equivalent to that achieved in an analog servo system by non-linearly manipulating a coefficient at the charge and discharge time of a CR time-constant circuit can be realized in a computerized digital servo-control system.

3 Claims, 2 Drawing Sheets

SERVO-CONTROL CIRCUIT

DESCRIPTION

1. Technical Field

This invention relates to a servo-control circuit in a digital servo system by using a microcomputer.

2. Background Art

In an ordinary digital servo system, the output of a proportional integrating circuit rises in the manner of a linear function when one pulse is inputted as a position command, and the mechanical system begins moving when torque exceeds the static frictional force of the mechanical system. When the integration gain of the proportional integrating circuit is low, overshoot develops in positioning the mechanical system and positioning precision declines as a result. Conversely, when the integration gain is high, overshoot does not occur but the rate of increase in torque takes on the form of a quadratic function and time is required for the mechanical system to actually begin moving once the position command has been applied, or one pulse may not be enough to produce movement.

Thus, it is necessary to select how the integrating gain in the digital servo system should be set depending upon the mechanical system of the object under control. However, finding an optimum value by variably setting a coefficient in an appropriate manner, as in an analog servo system, is not easy.

Accordingly, when it is attempted to set an optimum value for the mechanical system on each occasion to meet the mutually contradictory demands for positioning accuracy and servo response in a software servo system for controlling the conventional digital servo system, a problem that arises is increased cost of system design.

SUMMARY OF THE INVENTION

The present invention has been devised to solve the foregoing problem and its object is to provide a servo-control circuit which, in controlling the position of a mechanical system, maintains the precision of one-pulse feed without diminishing response.

According to the invention, there is provided a servo-control circuit having position feedback and velocity feedback loops, comprising arithmetic means for computing an error between position feedback from the mechanical system and a move command, and control means for suppressing an incomplete integration term, which is contained in the integration gain of the velocity feedback loop, when the error exceeds a set reference value.

The servo-control circuit of the invention is adapted to suppress an incomplete integration term, which is contained in the integration gain of the velocity feedback loop, at the moment the error exceeds a predetermined reference value. Therefore, overshoot in the mechanical system due to an excessively large torque command can be prevented by setting the incomplete integration term contained in the integration gain at an optimum value conforming to the mechanical system.

DESCRIPTION OF THE PREFERRED EMBODIMENT

An embodiment of the present invention will now be described in detail with reference to the drawings.

Figure 1:
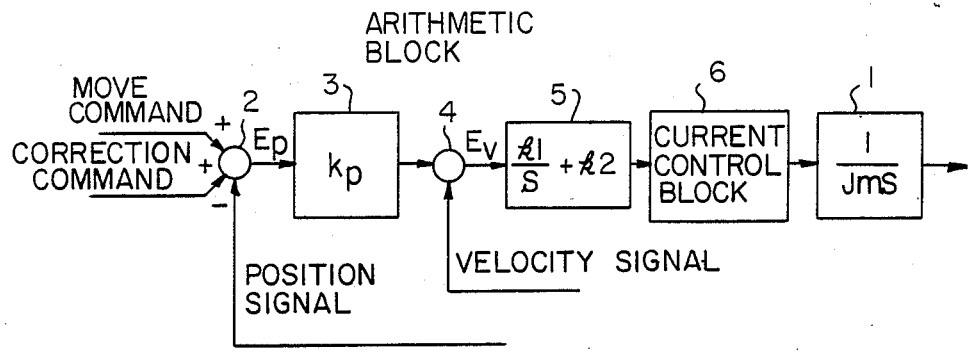
FIG. 1 is a block diagram illustrating an embodiment of the invention.

FIG. 1 is a system block diagram for realizing control with a digital servo system. Numeral 1 denotes a mechanical system which is the object of control. Here an input/output relationship is stipulated by a transfer function which includes a coefficient typified by motor inertia $J_m$. A move command inputted to this servo system is applied to an adder circuit 2 together with a backlash correction signal or a pitch error correction signal. The adder circuit computes an error $E_p$ between the command and a position signal fed back from a linear scale, such as an inductsyn or a pulse coder. An arithmetic block 3 including a position gain $K_p$ computes a velocity command from the error $E_p$ and inputs the velocity command to an adder circuit 4, which computes an error $E_v$ between the command and a velocity signal fed back from a pulse coder.

Numeral 5 denotes a velocity control block having a transfer function in which the incomplete integration term thereof is varied depending upon whether the error $E_p$ is zero or not. The output of this velocity control block 5 determines, via a current control block 6, a command current applied to a servomotor which drives the mechanical system 1. The characterizing feature of the present invention is that the incomplete integration term included in the integrating gain of the velocity feedback loop is controlled in the velocity control block 5 to prevent mechanical system overshoot caused by stick slip or the like.

Control of the incomplete integration term by the velocity control block 5 will now be described with reference to the analog servo system and signal waveforms shown in FIGS. 2(a) and 2(b).

Figure 2A:
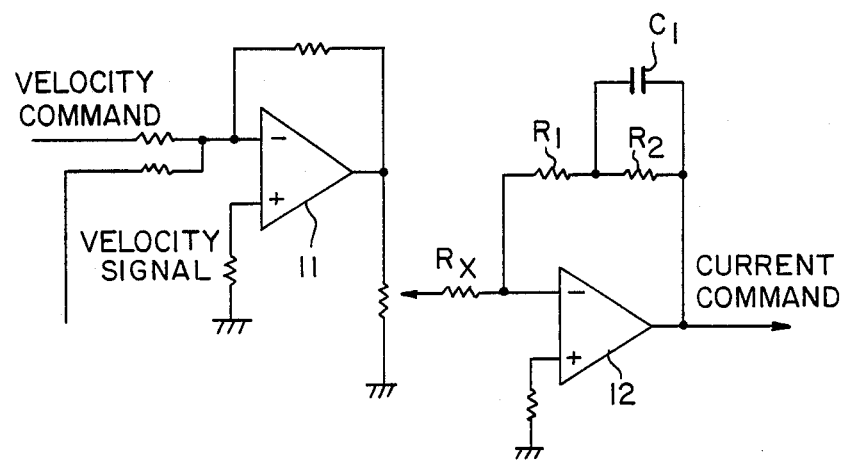
FIG. 2(a) is a circuit diagram of the FIG. 1 embodiment for an analog servo system.

In FIG. 2(a), a velocity error signal applied to a post-amplifier 12 from a preamplifier 11 to which a velocity command is inputted is supplied via a resistor Rx proportional to the integration gain of a command Tcmd shown in (b) of FIG. 2. A series circuit composed of two resistors $R_1$, $R_2$ is connected in parallel with the amplifier 12. The resistor $R_1$ corresponds to the proportional gain $k_2$ of the velocity control block 5 of FIG. 1, and the resistor $R_2$ corresponds to the incomplete integration gain. A capacitance $C_1$ connected in parallel with the resistor $R_2$ corresponds to the integration gain $k_1$ of the velocity control block 5.

Figure 2B:
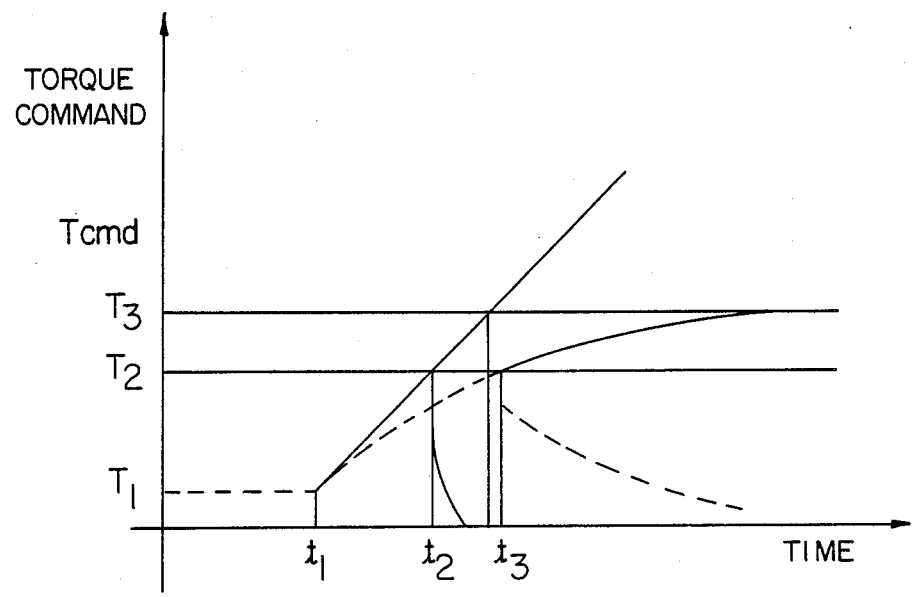
FIG. 2(b) is graph illustrating the state of an optimum torque command in the FIG. 1 embodiment.

When one pulse of a move command is inputted at a time $t_1$, as shown in FIG. 2(b), the torque command Tcmd rises along a straight line proportional to time if the value of resistor $R_2$ is made infinite. When the actual movement of position is detected at a time $t_2$ at which the torque command attains a predetermined value in dependence upon the static frictional characteristic of the mechanical system, the incomplete integration gain corresponding to the resistor $R_2$ is set to a predetermined value.

More specifically, if the resistor $R_2$ is made small before the start of movement of the mechanical system, positional accuracy deteriorates. In this case, in other words, torque gradually increases along a curve indicated by the dashed line in FIG. 2(b), so that the static frictional torque is not overcome even when one pulse of the move command is applied. As a result, it appears as if backlash is present even when there is linear scale feedback. Conversely, if the resistor $R_2$ is left infinitely large even after the mechanical system starts moving (at time $t_2$), excessive overshoot develops in the mechanical system after the start of movement.

Accordingly, if the moment at which the error between the position signal from the mechanical system and the movement command exceeds the preset reference value is determined based on, e.g., a change in the error $E_p$ inputted to the arithmetic block 3 having a position compensation function, and if the incomplete integration term included in the integration gain of the velocity feedback loop is controlled, the torque command curve becomes as shown by the solid line in FIG. 2(b) and overshoot caused by excessive torque will not occur.

In a case where the mechanical system is composed of a drive mechanism that does not include a gravity axis, it will be necessary to consider a fixed error value to the torque command value. Essentially, however, it will suffice to control the incomplete integration term in accordance with the position error $E_p$.

Though an embodiment of the present invention has been described, the invention is not limited thereto and can be modified in a variety of ways without departing from the scope of the claims.

The servo-control circuit of the present invention suppresses an incomplete integration term, which is contained in the integration gain of a velocity feedback loop, at the moment an error between a position signal from a mechanical system and a move command exceeds a set reference value. Therefore, overshoot in the mechanical system due to an excessively large torque command can be prevented by setting the incomplete integration term contained in the integration gain at an optimum value conforming to the mechanical system.

We claim:

1. A servo-control circuit having a position feedback loop and a velocity feedback loop including an integration element with an incomplete integration gain for controlling a mechanical system based on a position feedback error and a velocity feedback error, comprising:
   means for receiving a move command;
   arithmetic means for computing an error between the position feedback error and the move command; and
   control means for suppressing the incomplete integration gain when said error exceeds a set reference value.

2. A servo-control circuit according to claim 1, wherein the reference value of said error is set to zero in a case where the mechanical system is composed of a drive system that does not include a gravity axis.

3. A servo-control circuit according to claim 1, wherein said control means includes means for setting the incomplete integration gain to zero when said error exceeds the set reference value.

* * * * *